United States Patent [19]

Pattok

[11] Patent Number: 5,749,786

[45] Date of Patent: May 12, 1998

[54] SHAFT COUPLING IN MOTOR VEHICLE STEERING SHAFT

[75] Inventor: Eric David Pattok, Saginaw, Mich.

[73] Assignee: General Motors Corporation, Detroit, Mich.

[21] Appl. No.: 767,566

[22] Filed: Dec. 16, 1996

[51] Int. Cl.[6] ........................................ F16D 3/00
[52] U.S. Cl. .................. 464/106; 403/354; 464/162; 464/179
[58] Field of Search .......................... 464/106, 162, 464/179, 182, 78; 403/354, 355, 356, 357, 375

[56] References Cited

U.S. PATENT DOCUMENTS

| | | | |
|---|---|---|---|
| 1,398,054 | 11/1921 | Abegg . | |
| 1,832,554 | 11/1931 | Holstein | 403/354 |
| 2,197,140 | 4/1940 | Arvin | 464/179 |
| 2,381,770 | 8/1945 | Overly | 464/182 X |
| 2,761,299 | 9/1956 | Huddle | 464/162 |
| 2,846,858 | 8/1958 | Bellomo et al. | 464/106 |
| 2,973,214 | 2/1961 | Bates et al. | 464/106 X |
| 3,434,195 | 3/1969 | Ritsema | 29/437 |
| 3,719,378 | 3/1973 | Windsor | 403/354 X |
| 3,914,959 | 10/1975 | Leksen | 464/162 X |
| 3,940,946 | 3/1976 | Andersen | 464/89 |
| 4,034,574 | 7/1977 | Kuder | 464/106 |
| 4,106,311 | 8/1978 | Euler | 464/162 X |
| 4,188,801 | 2/1980 | Hugh et al. | 464/106 |
| 4,535,645 | 8/1985 | De Bisschop et al. | 74/492 |
| 4,572,023 | 2/1986 | Euler | 74/493 |
| 4,636,180 | 1/1987 | Runkle | 464/120 |
| 4,786,271 | 11/1988 | Menn | 464/140 |
| 5,293,921 | 3/1994 | Marocco | 160/176.1 |
| 5,383,811 | 1/1995 | Campbell et al. | 464/162 X |
| 5,509,324 | 4/1996 | Cymbal | 74/492 |

*Primary Examiner*—Eileen A. Dunn
*Attorney, Agent, or Firm*—Saul Schwartz

[57] ABSTRACT

A shaft coupling including a socket in an end of a first shaft element and a plunger on an end of a second shaft element. The plunger is divided by a longitudinal slot in the second shaft element into a pair of laterally flexible cantilever springs each having a pair of converging planar sides. Each of the converging planar sides of the cantilever springs has a transverse convex lobe at a distal end thereof and a concave recess inboard of the transverse convex lobe. The socket has a plurality of planar sides which define wedge-shaped corners facing the cantilever springs when the plunger is in the socket. The cantilever springs bias the transverse convex lobes thereon toward the wedge-shaped corners of the socket to rotatably couple the first and second shaft elements with zero dimensional tolerance therebetween. A flat shim in the longitudinal slot in the second shaft element limits additional flexure of the cantilever springs during torque transfer. The transverse convex lobes engage the planar sides of the sockets tangent to the transverse convex lobes to accommodate relative articulation and relative linear translation between the first and the second shaft elements.

4 Claims, 3 Drawing Sheets

5,749,786

1

SHAFT COUPLING IN MOTOR VEHICLE STEERING SHAFT

TECHNICAL FIELD

This invention relates to a shaft coupling in a steering shaft of a motor vehicle.

BACKGROUND OF THE INVENTION

A proposed "shaft assist" electric power steering gear for motor vehicles includes an electric motor mounted on a steering column of the motor vehicle and a speed reducer between the electric motor and a steering shaft rotatably supported on the steering column. The steering shaft has an upper segment with a manual steering wheel thereon, a lower segment linked to steered wheels of the motor vehicle, and a torsion bar between the upper and lower segments which resiliently resists relative rotation therebetween. A transducer measures the direction and angle of relative rotation between the upper and lower segments of the steering shaft and provides a corresponding electronic signal to a control module which turns the electric motor on and off. Precision bearings between a housing of the steering column and the lower segment of the steering shaft and between the housing and an end of the upper segment of the steering shaft adjacent to the transducer minimize transducer error attributable to lateral runout of adjacent ends of the upper and lower segments of the steering shaft. To isolate the precision bearing at the transducer end of the upper segment of the steering shaft from lateral runout at the opposite end of the upper segment attributable to a non-precision bearing near the manual steering wheel, the upper segment of the steering shaft is divided into separate elements coupled together by a shaft coupling according to this invention.

SUMMARY OF THE INVENTION

This invention is a new and improved shaft coupling including a socket in an end of a first shaft element and a plunger on an end of a second shaft element. The plunger is divided by a longitudinal slot in the second shaft element into a pair of laterally flexible cantilever springs each having a pair of converging planar sides. Each of the converging planar sides of the cantilever springs has a transverse convex lobe at a distal end thereof and a concave recess inboard of the transverse convex lobe. The socket has a plurality of planar sides which define wedge-shaped corners facing the cantilever springs when the plunger is in the socket. The cantilever springs bias the transverse convex lobes thereon toward the wedge-shaped corners of the socket to rotatably couple the first and second shaft elements with zero dimensional tolerance, i.e., angular lash, therebetween. A flat shim in the longitudinal slot in the second shaft element limits additional flexure of the cantilever springs during torque transfer through the shaft coupling to minimize relative rotation between the first and the second shaft elements attributable to such additional flexure. The transverse convex lobes engage the planar sides of the sockets tangent to the transverse convex lobes to accommodate relative articulation and relative linear translation between the first and the second shaft elements.

DESCRIPTION OF THE PREFERRED EMBODIMENT

Figure 1:
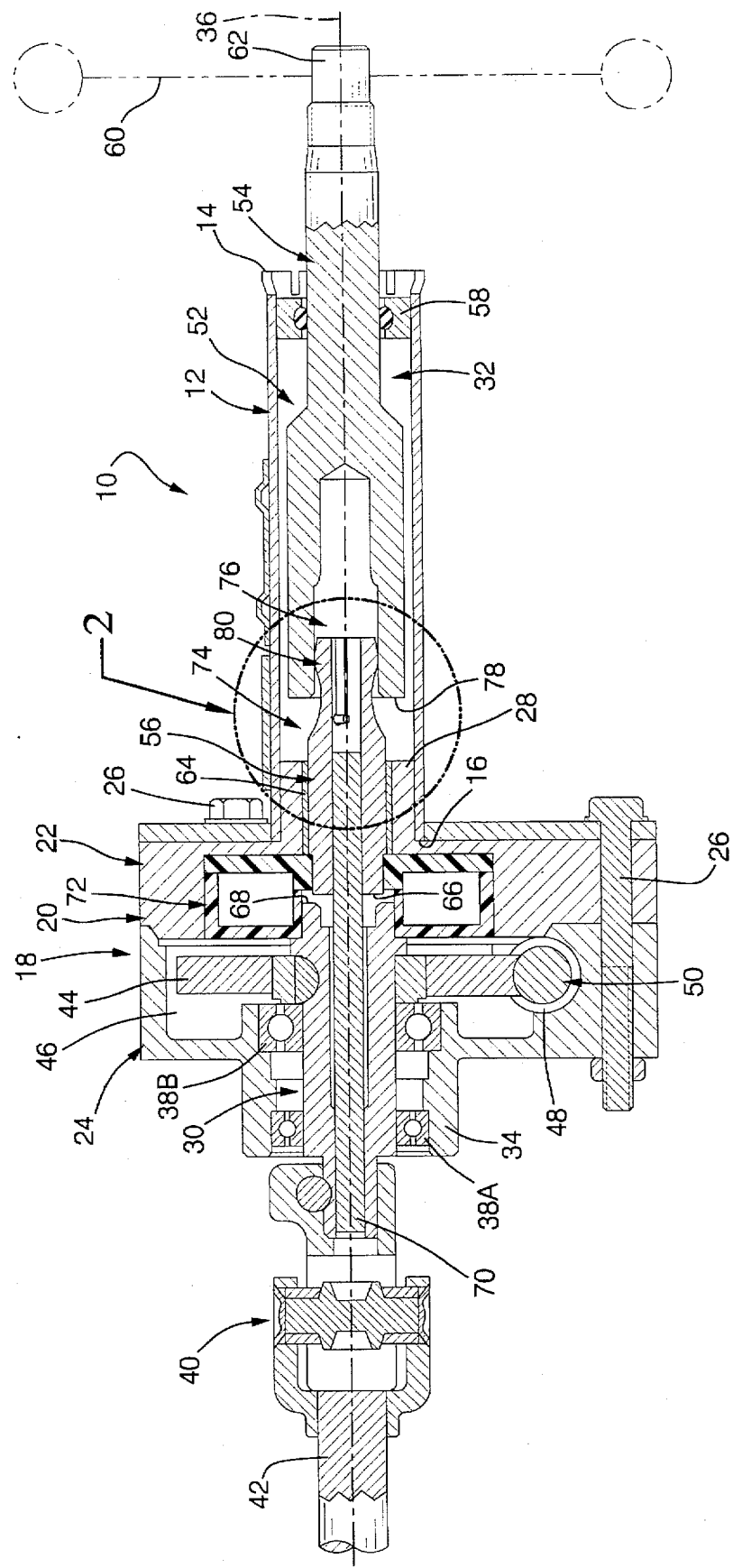
FIG. 1 is a longitudinal sectional view of a motor vehicle steering column having a steering shaft with a shaft coupling according to this invention therein.
Figure 2:
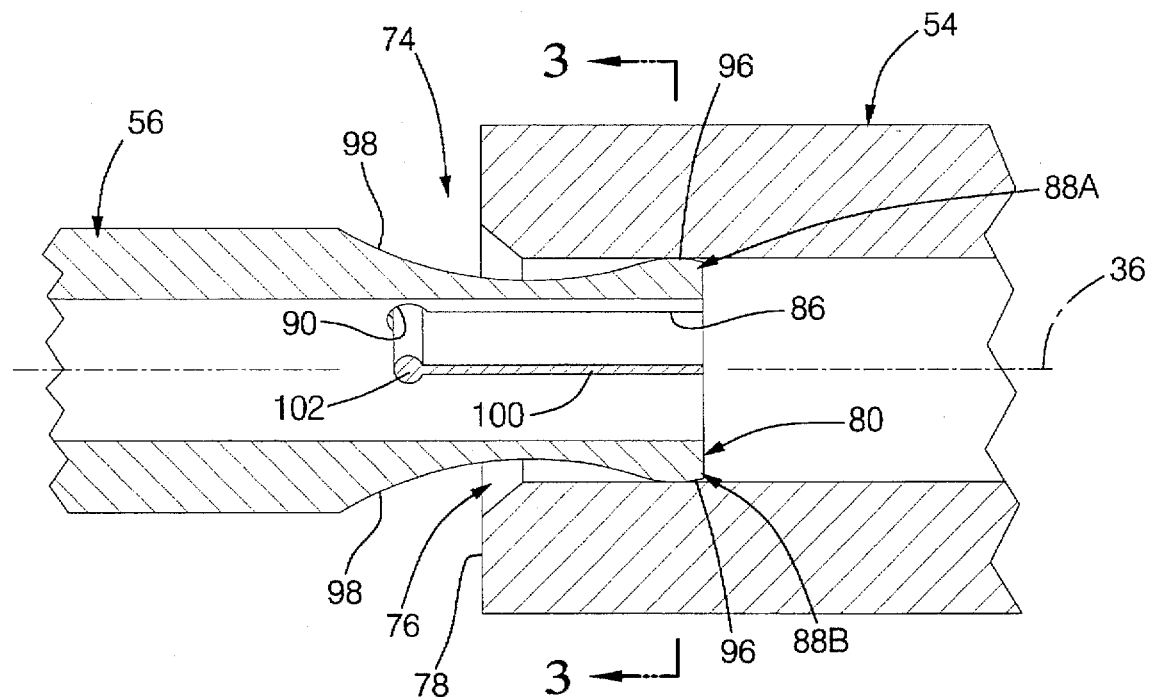
FIG. 2 is an enlarged view of a portion of FIG. 1 identified by reference circle 2 in FIG. 1.

Referring to FIG. 1, a motor vehicle steering column 10 includes a tubular housing 12 having an upper end 14 and a lower end 16. A fragmentarily illustrated shaft assist electric power steering gear 18 on the steering column 10 includes a speed reducer housing 20 consisting of a first cup-shaped part 22 and a second cup-shaped part 24 rigidly clamped together by a plurality of fasteners 26. The speed reducer housing 20 is rigidly attached to the steering column housing 12 by a tubular stem 28 of the first cup-shaped part 22 in the lower end 16 of the steering column housing.

A tubular lower segment 30 of a steering shaft 32 of the steering column 10 is supported on a tubular boss 34 of the second cup-shaped part 24 of the speed reducer housing for rotation about a longitudinal centerline 36 of the steering column by a pair of bearings 38A,38B. The lower segment 30 of the steering shaft protrudes beyond the tubular boss 34 and is connected by a conventional universal joint 40 to a schematically represented intermediate steering shaft 42 through which the steering shaft 32 is linked in conventional fashion to a steering gear, not shown, and to steered wheels of the motor vehicle.

A worm wheel 44 of the shaft assist electric power steering gear 18 is rigidly attached to the lower segment 30 of the steering shaft 32 in an internal chamber 46 of the speed reducer housing 20 between the first and the second cup-shaped parts 22,24 of the latter. Gear teeth, not shown, on the periphery of the worm wheel 44 mesh with a spiral tooth 48 on a worm gear 50 supported on the speed reducer housing 20 for rotation about a centerline in a plane perpendicular to the longitudinal centerline 36 of the steering column. The worm gear 50 is driven in either of two opposite directions by the armature shaft of an electric motor, not shown, rigidly mounted on the speed reducer housing 20. When the electric motor is on, the worm gear 50 and the worm wheel 44 cooperate to effect concurrent rotation of the lower segment 30 of the steering shaft 32 about the longitudinal centerline 36 of the steering column.

An upper segment 52 of the steering shaft 32 consists of a first element 54 and a tubular second element 56. The first element 54 is supported on the steering column housing 12 by a bearing 58 for rotation about the longitudinal centerline 36 of the steering column. A schematically represented manual steering wheel 60 is rigidly attached to an end 62 of the first element 54 beyond the upper end 14 of the steering column housing 12. The second element 56 is supported on the tubular stem 28 of the cup-shaped part 22 of the speed reducer housing 20 by a sleeve bearing 64 for rotation about the longitudinal centerline 36 of the steering column independent of the lower segment 30 of the steering shaft. An end 66 of the second element 56 of the upper segment of the steering shaft faces an end 68 of the lower segment 30 of the steering shaft.

A torsion bar 70 in the tubular lower segment 30 of the steering shaft and in the tubular second element 56 of the upper segment 52 of the steering shaft is rigidly connected at opposite ends to the lower segment 30 and to the second element 56. The torsion bar establishes a center position of the second element 56 of the upper segment 52 of the steering shaft relative to the lower segment 30 of the steering shaft and resists relative rotation therebetween with a force proportional to the angle of relative rotation. A lost motion connection, not shown, establishes a rigid connection between the ends 68,66 of the lower segment 30 and the second element 56 after a few degrees of relative rotation therebetween in opposite directions from the center position of the second element 56.

A schematically represented transducer 72 in the internal chamber 46 of the speed reducer housing 20, commonly referred to as a torque sensor, senses the direction and magnitude of relative rotation between the lower segment 30 of the steering shaft and the second element 56 of the upper segment 52 of the steering shaft and provides an electronic signal to a control module, not shown, which turns the aforesaid electric motor on and off. In order to minimize the effect on the transducer of lateral runout of the lower segment 30 and of the second element 56 at the respective facing ends 68,66 thereof, i.e., runout perpendicular to the longitudinal centerline 36 of the steering column, the bearings 38A,38B and the sleeve bearing 64 are precision bearings. The bearing 58 near the steering wheel 60 is substantially more remote from the transducer 72 and is a non-precision bearing. A shaft coupling 74 according to this invention between the first and the second elements 54,56 of the upper segment 52 of the steering shaft drivingly connects the first and second elements while isolating the precision bearing 64 near the transducer 72 from lateral runout near the steering wheel 60 attributable to the non-precision bearing 58.

As seen best in FIGS. 2-6, the shaft coupling 74 includes a socket 76 in an end 78 of the first element 54 of the upper segment 52 of the steering shaft and a plunger 80 on the end of the second element 56 of the upper segment 52 opposite the aforesaid end 66 of the second element. The socket 76 has a plurality of planar sides 82A, 82B, 82C, 82D, FIG. 4, parallel to the longitudinal centerline 36 of the steering column which converge to define a pair of opposite, wedge-shaped corners 84A, 84B of the socket.

The plunger 80 has a plurality of planar sides parallel to the longitudinal centerline 36 of the steering column facing the planar sides 82A-82D of the socket when the plunger is in the socket. A longitudinal slot 86 in the second element 56 of the upper segment 52 of the steering shaft divides the plunger 80 into a pair of laterally flexible cantilever springs 88A, 88B, i.e., flexible perpendicular to the longitudinal centerline 36 of the steering column. The slot 86 terminates at a cross bore 90 in the second element. The planar sides of the plunger 80 cooperate in defining an external wedge 92 on the cantilever spring 88A which faces the wedge-shaped corner 84A of the socket 76 and an external wedge 94 on the cantilever spring 88B which faces the wedge-shaped corner 84B of the socket 76.

Each planar side of the plunger 80 has a transverse convex lobe 96 thereon, i.e., in a common plane perpendicular to the longitudinal centerline 36, where the planar sides intersect the end of the second element 56 of the upper segment 52 of the steering shaft. Each planar side of the plunger 80 also has a concave recess 98 therein on the opposite side of the corresponding transverse convex lobe 96 from the end of the second element 56. A pair of span dimensions $D_1$, $D_2$, FIG. 5, of the plunger 80 across the tips of the transverse convex lobes 96 exceed a corresponding pair of span dimensions $D_3$, $D_4$ of the socket 76 across the planar sides 82A-82D thereof so that when the plunger 80 is inserted into the socket 76, the cantilever springs 88A, 88B are flexed inward toward each other. With the cantilever springs flexed inward, the transverse convex lobes 96 are resiliently wedged against the planar sides 82A-82D of the socket forming the wedge-shaped corners 84A, 84B to connect the first and second elements 54, 56 of the upper segment 52 of the steering shaft 32 for unitary rotation about the longitudinal centerline 36 with zero dimensional tolerance therebetween.

The planar sides 82A-82D of the socket 76 engage the transverse convex lobes 96 tangent to the latter and inboard of the end 78 of the first element 54 of the upper segment 52 of the steering shaft. The lines of contact between the transverse convex lobes 96 and the planar sides of the socket 76 define fulcrums about which the first and second elements 54, 56 of the upper segment 52 of the steering shaft are pivotable relative to each other while the concave recesses 98 in the planar sides of the plunger 80 separate the end 78 of the first element 54 from the planar sides of the plunger to accommodate about two degrees of relative articulation therebetween. In addition, the tangential contact between the transverse convex lobes 96 and the planar sides 82A-82D of the socket 76 accommodates linear translation of the first element 54 relative to the second element 56 in the direction of the longitudinal centerline 36 of the steering column with minimum sliding friction therebetween.

Figure 3:
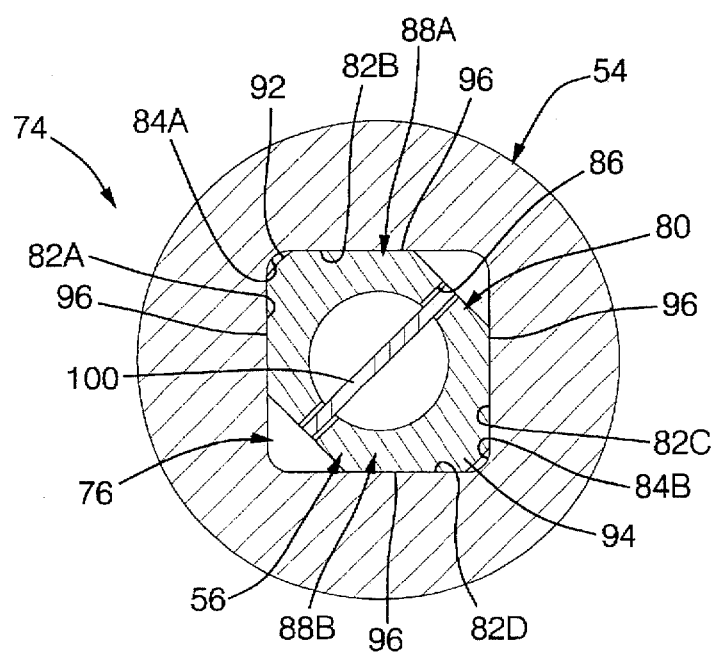
FIG. 3 is a sectional view taken generally along the plane indicated by lines 3—3 in FIG. 2.
Figure 4:
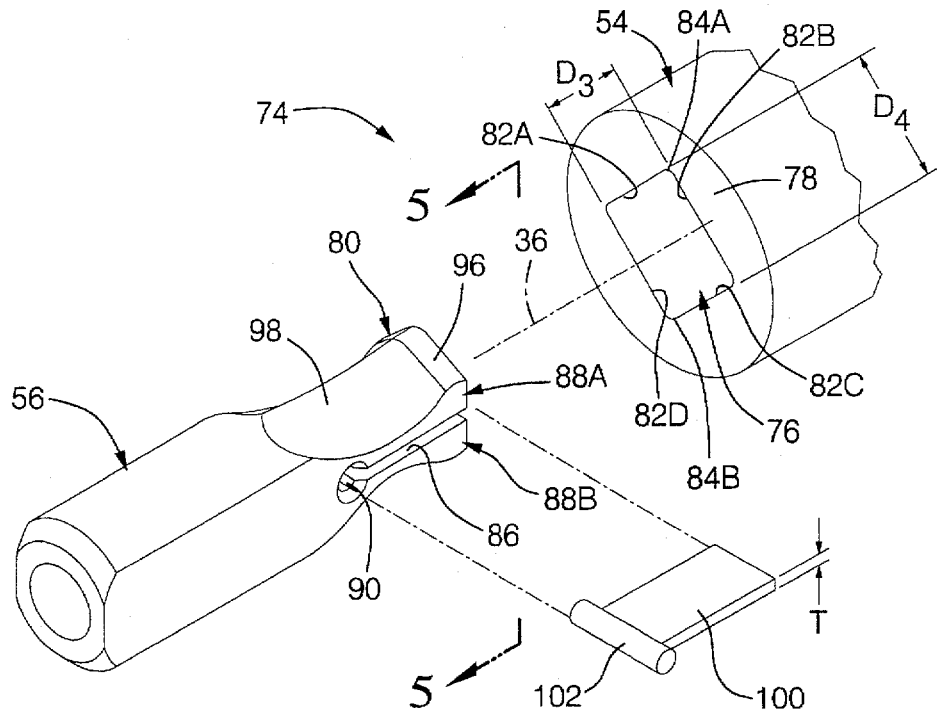
FIG. 4 is an exploded perspective view of the shaft coupling according to this invention.
Figure 5:
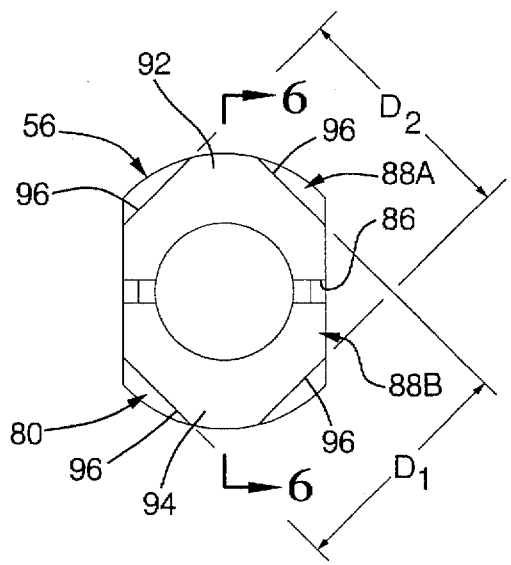
FIG. 5 is a view taken generally along the plane indicated by lines 5—5 in FIG. 4.
Figure 6:
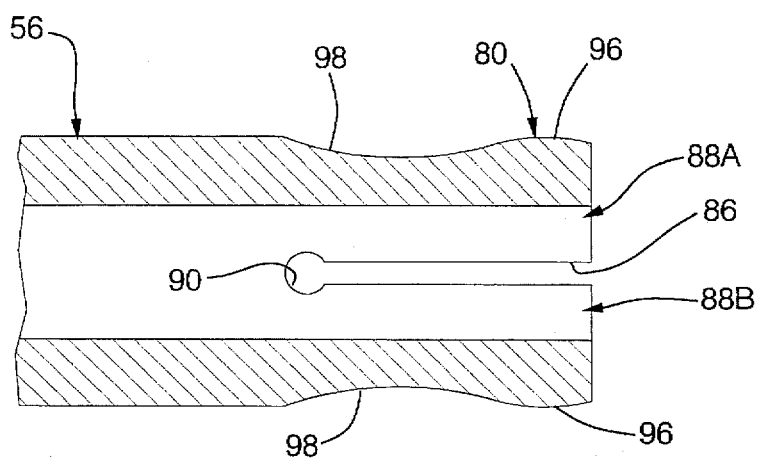
FIG. 6 is a sectional view taken generally along the plane indicated by lines 6—6 in FIG. 5.

As seen best in FIGS. 3-4, a flat plastic shim 100 in the longitudinal slot 86 in the second element 56 of the upper segment 52 of the steering shaft 32 has a thickness dimension "T" less than the thickness of the slot 86 when the plunger 80 is in the socket 76. The shim 100 is retained in the slot 86 by an integral bar 102 across the shim which is interference fitted in the cross bore 90. When manual effort applied at the steering wheel 60 is transferred between the first and second elements 54, 56 of the upper segment 52 of the steering shaft 32 through the shaft coupling 74, the planar sides 82A-82D of the socket 76 induce reaction forces on the cantilever springs 88A, 88B urging further inward flexure of each. The thickness dimension T of the flat shim 100 is calculated to minimize the amount of additional inward flexure experienced by the cantilever springs to eliminate perceptible angular lash between the first and second elements 54, 56 of the upper segment 52 of the steering shaft regardless of the magnitude of the manual effort applied at the steering wheel 60.

I claim:

1. A shaft coupling between a first shaft element and a second shaft element comprising:

a socket in an end of said first shaft element having a plurality of planar sides parallel to a longitudinal centerline of said first shaft element cooperating in defining an opposite pair of wedge-shaped corners of said socket, a plunger on an end of said second shaft element disposed in said socket, a longitudinal slot in said end of said second shaft element dividing said plunger into a pair of cantilever springs flexible laterally relative to a longitudinal centerline of said second shaft element, a plurality of planar sides on said plunger parallel to said longitudinal centerline of said second shaft element and cooperating in defining an external wedge on each of said cantilever springs facing corresponding ones of said wedge-shaped corners of said socket, a transverse convex lobe on each of said planar sides of said plunger engageable tangentially on a corresponding one of said planar sides of said socket, a pair of span dimensions of said plunger across said convex lobes on said planar sides of said plunger exceeding a pair of span dimensions of said socket across said planar sides thereof so that each of said cantilever springs is resiliently flexed when said plunger is in said socket and said external wedges on said plunger at said convex lobes thereon are wedged into said corresponding ones of said wedge-shaped corners of said socket, and a recess on each of said planar sides of said plunger adjacent a corresponding one of said transverse convex lobes accommodating relative articulation between said first and said second shaft elements about fulcrums defined at lines of tangential contact between said transverse convex lobes and said corresponding ones of said planar sides of said socket.

2. The shaft coupling recited in claim 1 further comprising:

flexure limiting means on said second shaft element operative to limit flexure of each of said pair of cantilever springs attributable to transfer of torque between said first and said second shaft elements through said shaft coupling.

3. The shaft coupling recited in claim 2 wherein said flexure limiting means comprises:

a flat shim in said longitudinal slot in said second shaft element.

4. The shaft coupling recited in claim 3 further comprising:

a cross bore in said second shaft element at an inboard end of said longitudinal slot in said second shaft element, and a bar on an end of said flat shim interference fitted in said cross bore to retain said flat shim in said longitudinal slot in said second shaft element.

* * * * *